US011021597B2

(12) United States Patent
Gitsas et al.

(10) Patent No.: US 11,021,597 B2
(45) Date of Patent: Jun. 1, 2021

(54) BIAXIALLY ORIENTED FILMS MADE OF PROPYLENE POLYMER COMPOSITIONS

(71) Applicant: BOREALIS AG, Vienna (AT)

(72) Inventors: Antonios Gitsas, Linz (AT); Dietrich Gloger, Linz (AT); Hermann Braun, Linz (AT); Franciscus Jacobs, Evergem (BE); Davide Tranchida, Linz (AT); Wolfram Stadlbauer, Kefermarkt (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/766,399

(22) PCT Filed: Oct. 14, 2016

(86) PCT No.: PCT/EP2016/074649
§ 371 (c)(1),
(2) Date: Apr. 6, 2018

(87) PCT Pub. No.: WO2017/064224
PCT Pub. Date: Apr. 20, 2017

(65) Prior Publication Data
US 2018/0298172 A1 Oct. 18, 2018

(30) Foreign Application Priority Data
Oct. 16, 2015 (EP) .................................... 15190159

(51) Int. Cl.
B32B 27/32 (2006.01)
C08L 23/12 (2006.01)
C08J 5/18 (2006.01)
H01G 4/18 (2006.01)

(52) U.S. Cl.
CPC .................. *C08L 23/12* (2013.01); *C08J 5/18* (2013.01); *H01G 4/18* (2013.01); *C08J 2323/12* (2013.01); *C08J 2423/12* (2013.01); *C08J 2423/20* (2013.01); *C08J 2427/04* (2013.01); *C08L 2203/16* (2013.01); *C08L 2203/20* (2013.01); *C08L 2205/025* (2013.01); *C08L 2205/03* (2013.01); *C08L 2205/24* (2013.01)

(58) Field of Classification Search
CPC .......... C08L 23/10; C08L 23/12; C08L 23/14; C08L 23/142; C08L 23/145; C08F 10/06; C08F 110/06; C08F 210/06
See application file for complete search history.

(56) References Cited

U.S. PATENT DOCUMENTS

| 4,551,501 A * | 11/1985 | Shiga .................... C08F 297/08 525/216 |
| 4,916,198 A * | 4/1990 | Scheve .................. C08F 110/06 522/129 |
| 6,300,415 B1 | 10/2001 | Okayama et al. |
| 6,503,993 B1 * | 1/2003 | Huovinen ................ C08F 10/06 526/348.1 |
| 7,923,511 B2 * | 4/2011 | Aasetre .................. C08F 297/08 525/191 |
| 8,163,845 B2 | 4/2012 | Busch et al. |
| 2009/0131611 A1 * | 5/2009 | Stadlbauer .............. C08F 10/00 526/65 |
| 2015/0050456 A1 * | 2/2015 | Nakatsuka ................. C08J 5/18 428/141 |

FOREIGN PATENT DOCUMENTS

| CN | 1276814 A | 12/2000 |
| CN | 1471543 A | 1/2004 |
| CN | 101848961 A | 9/2010 |
| CN | 102356439 A | 2/2012 |
| EP | 0607703 A1 | 7/1994 |
| EP | 1028984 B1 | 8/2000 |
| EP | 1028985 B1 | 8/2000 |
| EP | 1030878 B1 | 8/2000 |
| EP | 1801155 B1 | 6/2007 |
| EP | 1801157 B1 | 6/2007 |
| EP | 1818365 A1 | 8/2007 |
| EP | 1894715 A1 | 3/2008 |
| EP | 1985649 A1 | 10/2008 |
| EP | 2410539 A1 | 1/2012 |
| EP | 2418237 A1 | 2/2012 |
| EP | 2543684 A1 | 1/2013 |
| JP | S62121704 | * 6/1987 |
| JP | H05288747 A | 11/1993 |
| JP | 2869606 B2 | * 3/1999 |
| JP | 2004512400 A | 4/2004 |
| JP | 2004-161799 A | 6/2004 |
| JP | 2007169595 A | 7/2007 |
| JP | 2009231705 A | 10/2009 |
| JP | 2009542872 A | * 12/2009 |
| JP | 2012149171 A | 8/2012 |

(Continued)

OTHER PUBLICATIONS

Machine Translation of JP-2869606 (Year: 1999).*
Chemical Basis of Polymer Insulating Materials Machine Translation (Year: 2007).*
Plastic Nucleation Formula Design Machine Translation (Year: 2020).*
Written Opposition for Japanese Application 2020-700268 Part 1 Machine Translation (Year: 2020).*
Written Opposition for Japanese Application 2020-700268 Part 2 Machine Translation (Year: 2020).*

(Continued)

*Primary Examiner* — Zachary M Davis
(74) *Attorney, Agent, or Firm* — Tarolli, Sundheim, Covell & Tummino LLP

(57) ABSTRACT

The present invention is biaxially oriented film comprising a layer comprising a propylene polymer composition comprising a high isotactic homopolymer of propylene and a polymeric α-nucleating agent. The composition may also comprise other propylene polymers.

9 Claims, No Drawings

(56) References Cited

FOREIGN PATENT DOCUMENTS

| | | |
|---|---|---|
| JP | 2013027977 A | 2/2013 |
| JP | 2015162560 A | 9/2015 |
| JP | 6136054 B2 | 5/2017 |
| KR | 20100077035 A | 7/2010 |
| WO | 99/24479 A1 | 5/1999 |
| WO | 9924478 A1 | 5/1999 |
| WO | 00/68315 A1 | 11/2000 |
| WO | 02/34803 A1 | 5/2002 |
| WO | 2007094072 A1 | 8/2007 |
| WO | WO-2013146367 A1 * 10/2013 ................ C08J 5/18 |
| WO | 2014075971 A1 | 5/2014 |
| WO | 2014148547 A1 | 9/2014 |
| WO | 2014/166779 A1 | 10/2014 |
| WO | 2014/202432 A1 | 12/2014 |

OTHER PUBLICATIONS

Written Opposition for Japanese Application 2020-700268 Part 3 Machine Translation (Year: 2020).*

Office action for Taiwan patent application No. 105133023.

Resconi, et al., "Selectivity in Propene Polymerization with Metallocene Catalysts", Chem. Rev. 2000, 100, 1253-1345.

Zhou, et al., "A new decoupling method for accurate quantification of polyethylene copolymer composition and triad sequence distribution with 13C NMR", Journal of Magnetic Resonance 187 (2007) 225-233.

Fujiyama et al., "Study on Rough-Surface Biaxially Oriented Polypropylene Film. IV. Influence of Addition of Crystal Nucleator", Journal of Applied Polymer Science, vol. 36, 1025-1034 (1988).

H. N. Cheng, "13C NMR Analysis of Ethylene-Propylene Rubbers", Macromolecules 1984, 17, 1950-1955.

Busico et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.

Busico, et al., "Full Assignment of the 13C NMR Spectra of Regioregular Polypropylenes: Methyl and Methylene Region", Macromolecules 1997, 30, 6251-6263.

Busico et al., "Microstructure of polypropylene", Progress in Polymer Science, 26 (2001) 443-533.

Wang, et al., "Structural Analysis of Ethylene/Propylene Copolymers Synthesized with a Constrained Geometry Catalyst", Macromolecules 2000, 33, pp. 1157-1162.

Office action for Japanese Patent Application No. 2018-515867, dated Sep. 18, 2018.

First Notification of Office Action for Chinese Patent Application No. 201680058236.8, dated Nov. 5, 2018.

Office action for Korean Patent Application No. 10-2018-701393, dated Jun. 20, 2018.

Office action for India Patent Application No. 201817016431, dated Dec. 18, 2019.

Written Opposition for Japanese Application No. 2020-700268 dated May 2, 2020.

Chemical Basis of Polymer Insulating Materials, edited by Li Changming, Harbin Institute of Technology Press, published in Mar., 2007, p. 190—No English Abstract Available.

Plastic nucleation formula design—No English Abstract Available.

Chinese Office Action for Application No. 201680058236,8 dated Jul. 3, 2020.

* cited by examiner

BIAXIALLY ORIENTED FILMS MADE OF PROPYLENE POLYMER COMPOSITIONS

FIELD OF THE INVENTION

The present invention relates to a biaxially oriented film comprising a propylene polymer composition. More specifically, the present invention relates to a capacitor film having improved electrical properties.

Problem to be Solved

Capacitor films made of polypropylene are well known in the art.

EP-A-1894715 discloses biaxially oriented films made of a polypropylene composition comprising a blend of a linear polypropylene having Mw/Mn of more than 5 and a long-chain branched polypropylene. The films are suitable for making capacitors.

EP-A-1985649 discloses biaxially oriented films having a specific surface roughness and preferably comprising from 0.05 to 3% of long-chain branched polypropylene. The films were disclosed to be suitable for making capacitors having good electrical properties.

Fujiyama et al. (Journal of Applied Polymer Science, Vol. 36, pages 1025-1033 (1988)) disclose that when using an α-nucleating agent in polypropylene smooth films with reduced surface roughness were obtained when compared to films which contained either no nucleating agent or a β-nucleating agent. This document suggests that the presence of an α-nucleating agent would result in inferior biaxially oriented PP films.

The prior art biaxially oriented PP (BOPP) films comprising long-chain branched PP were disclosed to have good properties. However, the process for producing long-chain branched PP is complicated, leading to a high cost of the material. It is therefore one objective of the present invention to provide BOPP films which can be produced economically in a simpler process than the prior art films and which have at least as good electrical and mechanical properties as the prior art films.

Another objective of the present invention is to provide BOPP films which are suitable for use in capacitors and which have improved electrical and mechanical properties compared to the prior art films.

A further objective of the present invention is to provide capacitors which are durable and which operate a long time without a failure.

SUMMARY OF THE INVENTION

As seen from one aspect, the present invention provides a biaxially oriented film comprising a layer comprising a propylene polymer composition (A) comprising (i) from 90 to 99.99% by weight of a high isotactic homopolymer of propylene having a content of isotactic pentad fraction of from 93 to 98% and a melt flow rate MFR$_2$ of from 0.5 to 10 g/10 min; and (ii) from 0.0000001 to 1% by weight of a polymeric α-nucleating agent; optionally, (iii) from 0 to 9.99% by weight of a propylene homo- or copolymer other than (i); and (iv) from 0.01 to 1.0% by weight of conventional additives, the percentages being based on the weight of the propylene polymer composition (A).

As seen from another aspect, the present invention provides the use of such films for making capacitors.

As seen from a further aspect, the present invention provides capacitors comprising such films.

As seen from still a further aspect the present invention provides a polymer composition comprising from 90 to 99.99% by weight of a high isotactic homopolymer of propylene having a content of isotactic pentad fraction of from 93 to 98%, from 0.01 to 1.0% by weight of conventional additives (iv) and from 0.01 to 1 ppm, preferably from 0.01 to 0.5 ppm of a polymeric α-nucleating agent, all percentages and ppms being based on the combined weight of the homopolymer of propylene, the conventional additives and the polymeric α-nucleating agent.

As seen from yet another aspect the present invention provides a process for producing a biaxially oriented film comprising the steps of: combining from 90 to 99.9% by weight of a high isotactic homopolymer of propylene having a content of isotactic pentad fraction of from 93 to 98% and a melt flow rate MFR$_2$ of from 0.5 to 10 g/10 min with from 0.1 to 10% by weight of a propylene homo- or copolymer containing from 0.1 to 200 ppm of a polymeric α-nucleating agent; extruding the composition to a sheet; stretching the sheet in machine and transverse directions so that the stretching ratio in machine direction is from 4:1 to 10:1 and the stretching ratio in transverse direction is from 5:1 to 10:1 and the thickness of the film is from 1 μm to 10 μm.

DETAILED DESCRIPTION

The propylene polymer composition (A) comprises a high isotactic homopolymer of propylene (i), a polymeric α-nucleating agent (ii) and, optionally, a propylene homo- or copolymer (iii) other than the high isotactic homopolymer of propylene (i).

The propylene polymer composition (A) also comprises conventional additives (iv), such as one or more additives selected from antioxidants, process stabilisers and acid scavengers, preferably selected from antioxidants and acid scavengers.

Preferably, the propylene polymer composition (A) consists of the high isotactic homopolymer of propylene (i), the polymeric α-nucleating agent (ii) and, optionally, the propylene homo- or copolymer (iii) other than the high isotactic homopolymer of propylene (i) and the conventional additives (iv).

High Isotactic Homopolymer of Propylene

The high isotactic homopolymer of propylene (i) is the main constituent of the propylene polymer composition (A). The composition (A) comprises from 90 to 99.99% by weight, preferably from 95 to 99.9% by weight, more preferably from 98 to 99.99% by weight and in particular from 99 to 99.9% by weight of the high isotactic homopolymer of propylene (i).

The high isotactic homopolymer of propylene (i) has a melt flow rate MFR$_2$ of from 0.5 to 10 g/10 min, preferably from 1 to 7 g/10 min. A too low MFR has a consequence of poor processability. On the other hand, a too high MFR has the consequence of sagging at the elevated temperatures used in the BOPP process.

The high isotactic homopolymer of propylene (i) has a content of isotactic pentads (mmmm-fraction) of from 93 to 98%, preferably from 94 to 98%, such as from 95 to 98%. The content of the isotactic pentads is calculated as the percentage of the mmmm-pentads from all the pentads. A too low content of pentads has a consequence that the final crystallinity of the film becomes rather low and the tensile properties and moduli of the film decrease. On the other hand, a too high content of pentads has the consequence that there may be frequent film breaks during film orientation in machine direction, on one hand, and more specifically in cross direction in the tenter oven, on the other hand.

The high isotactic homopolymer of propylene (i) preferably has an ash content of not more than 30 ppm, more preferably not more than 20 ppm and in particular not more than 15 ppm, such as not more than 10 ppm. Too high ash content could be detrimental for the dielectric properties of the film, especially if the ash contains metal residues. Such films cannot be used for making capacitors.

A process which is particularly effective in producing propylene homopolymers which are suitable for making the films for the present invention is disclosed in EP-A-2543684 where a catalyst based on a solid component comprising titanium trichloride was used in combination with an aluminium alkyl, organic ether and an alkyl methacrylate.

The polymerisation is conveniently conducted in slurry. In such a process the catalyst, hydrogen and propylene monomer are contacted in a diluent comprising essentially one or more alkanes having from 4 to 15 carbon atoms, preferably from 10 to 14 carbon atoms. By "comprising essentially" is hereby meant that the diluent comprises at least 90%, preferably at least 95% and more preferably at least 99% by weight of one or more of such alkanes.

The polymerisation is typically conducted at a temperature of from 50 to 100° C., preferably at 60 to 80° C. and a pressure of from 1 to 50 bar, preferably from 3 to 15 bar.

Preferably the process comprises one or more washing steps. Washing is typically conducted by contacting polymer slurry with a hydrocarbon diluent in one or more steps. After the contacting step the excess diluent is typically removed, for instance by centrifuging.

Preferably the polymer slurry is contacted with the hydrocarbon diluent in at least two steps. When the washing includes multiple steps it is then preferred that in at least one step an alcohol or an ether is present in addition to the hydrocarbon diluent. This facilitates the removal of the catalyst components from the polymer and thereby a polymer with very low ash content can be obtained.

Polymeric α-Nucleating Agent

The propylene polymer composition (A) comprises a polymeric α-nucleating agent (ii). The polymeric α-nucleating agent (ii) is a polymer of a vinyl compound of the formula $CH_2=CH-CHR_6R_7$, wherein $R_6$ and $R_7$ together form a 5- or 6-membered saturated, unsaturated or aromatic ring or independently represent an alkyl group comprising 1 to 4 carbon atoms. Preferably the polymeric α-nucleating agent (ii) is a homopolymer of the vinyl compound of the formula $CH_2=CH-CHR_6R_7$.

The propylene polymer composition (A) comprises from 0.0000001 to 1% by weight of the polymeric α-nucleating agent (or, from 0.001 ppm to 10000 ppm), preferably from 0.000001 to 0.01% by weight (or, from 0.01 ppm to 100 ppm), and especially preferably from 0.000001 to 0.005% by weight (or, from 0.01 ppm to 50 ppm) of the polymeric α-nucleating agent (ii). In particular the propylene polymer composition (A) comprises from 0.000001 to 0.001% by weight (or, from 0.01 ppm to 10 ppm), and even more preferably from 0.000001 to 0.0005% by weight (or, from 0.01 ppm to 5 ppm) of the polymeric α-nucleating agent (ii), based on the weight of the propylene polymer composition (A).

One method for incorporating the polymeric α-nucleating agent (ii) into the propylene polymer composition (A) includes prepolymerising the polymerisation catalyst by contacting the catalyst with the vinyl compound of the formula $CH_2=CH-CHR_6R_7$, wherein $R_6$ and $R_7$ together form a 5- or 6-membered saturated, unsaturated or aromatic ring or independently represent an alkyl group comprising 1 to 4 carbon atoms. Propylene is then polymerised in the presence of such prepolymerised catalyst.

In the prepolymerisation the catalyst is prepolymerised so that it contains up to 5 grams of prepolymer per gram of solid catalyst component, preferably from 0.1 to 4 grams of prepolymer per one gram of the solid catalyst component. Then, the catalyst is contacted at polymerisation conditions with the vinyl compound of the formula $CH_2=CH-CHR_6R_7$, wherein $R_6$ and $R_7$ are as defined above. Especially preferably $R_6$ and $R_7$ then form a saturated 5- or 6-membered ring. Especially preferably the vinyl compound is vinylcyclohexane. Especially preferably the catalyst then contains from 0.5 to 2 grams of the polymerised vinyl compound, such as poly(vinylcyclohexane), per one gram of solid catalyst component. This allows the preparation of nucleated polypropylene as disclosed in EP-A-607703, EP-A-1028984, EP-A-1028985 and EP-A-1030878.

Preferably the prepolymerisation is conducted in slurry in an inert diluent at a temperature within the range of from 20 to 80° C., preferably from 35 to 65° C. The pressure is not critical and can be selected from an atmospheric pressure to 50 bar. The reaction time is selected so that the amount of unreacted vinyl compound is less than a predetermined limit, such as less than 2000 ppm by weight of the reaction mixture, or less than 1000 ppm.

As described above, according to one method the propylene polymer composition (A) is produced by homopolymerising propylene in the presence of such prepolymerised catalyst. The propylene homopolymer is thereby nucleated by the polymeric α-nucleating agent (ii). The propylene polymer composition (A) then preferably comprises from 0.1 to 200 ppm of the polymeric α-nucleating agent (ii), preferably poly(vinylcyclohexane), based on the weight of the propylene polymer composition (A). The polymerisation process and the catalyst are then suitably as described above. Thereby the high isotactic homopolymer of propylene (i) is formed on the catalyst containing the polymeric α-nucleating agent (ii).

Alternatively, and more preferably, the propylene polymer composition (A) is produced by homopolymerising propylene in the presence of a polymerisation catalyst which has not been prepolymerised with the vinyl compound as disclosed above, thereby producing the high isotactic homopolymer of propylene (i). In such a case the high isotactic propylene homopolymer (i) is combined before or at the extrusion step with a propylene homo- or copolymer (iii) which has been produced by homopolymerising propylene or copolymerising propylene and a comonomer in the presence of a catalyst which has been prepolymerised with the vinyl compound as referred to above.

Propylene Homo- or Copolymer

As discussed above, the propylene homo- or copolymer (iii) is typically present as a carrier polymer for the polymeric α-nucleating agent (ii). The propylene homo- or copolymer (iii) then preferably comprises from 0.5 to 200 ppm, preferably from 1 to 200 ppm, such as 1 to 100 ppm of the polymeric α-nucleating agent (ii), preferably poly (vinylcyclohexane), based on the weight of the propylene homo- or copolymer (iii). When the polymeric α-nucleating agent (ii) is introduced into the propylene polymer composition (A) with the propylene homo- or copolymer (iii) the amount of the homo- or copolymer of propylene (iii) which contains the polymeric α-nucleating agent (ii) is from 0.1 to 9.99% by weight, based on the propylene polymer composition (A), preferably from 0.2 to 4.99% by weight, more preferably from 0.2 to 1.99% by weight and in particular from 0.2 to 0.99% by weight, based on the propylene polymer composition (A).

The propylene homo- or copolymer (iii) may be any homo- or copolymer of propylene. Preferably the homo- or copolymer (iii) is relatively similar to the high isotactic homopolymer of propylene (i). Thus, it is preferred that the homo- or copolymer (iii) is a homopolymer of propylene. Furthermore, if the properties of the homo- or copolymer (iii) are substantially different from those of the homopolymer (i) then it is preferred that the amount of the homo- or copolymer (iii) in the propylene polymer composition (A) does not exceed 2% by weight.

The propylene homo- or copolymer (iii) preferably has a branching index g of at least 0.9. Thereby the propylene homo- or copolymer (iii) is preferably substantially free of long chain branches. Especially, the propylene homo- or copolymer (iii) does not contain long chain branches in a detectable amount.

The propylene homo- or copolymer (iii) can be produced according to the methods known in the art. As described above for the propylene polymer composition (A), according to one method the propylene homo- or copolymer (iii) is produced by homopolymerising propylene in the presence of a catalyst which is prepolymerised with a vinyl compound of the formula $CH_2=CH-CHR_6R_7$, wherein $R_6$ and $R_7$ are as defined above. Preferably the vinyl compound is vinylcyclohexane. The propylene homo- or copolymer (iii) is thereby nucleated by the polymeric α-nucleating agent (ii). The propylene homo- or copolymer (iii) then preferably comprises from 0.1 to 200 ppm of the polymeric α-nucleating agent (ii), preferably poly(vinylcyclohexane), based on the weight of the propylene homo- or copolymer (iii).

According to one suitable embodiment of the invention the polymerisation process and the catalyst for producing the propylene homo- or copolymer (iii) are similar to what was described above for the high isotactic homopolymer of propylene (i). Thereby the propylene homo- or copolymer (iii) is formed on the catalyst containing the polymeric α-nucleating agent (ii).

According to an especially preferred embodiment of the invention the propylene homo- or copolymer (iii) is produced by homopolymerising propylene or copolymerising propylene and one or more comonomers selected from the group consisting of ethylene and alpha-olefins having from 4 to 8 carbon atoms in the presence of a Ziegler-Natta catalyst comprising a solid component containing magnesium, titanium, chlorine and an internal donor, such as a phthalate, a maleate or a citraconate; an aluminium alkyl, such as triethylaluminium; and an external donor, such as a silicon ether, for instance, dicyclopentyldimethoxysilane, which catalyst has been prepolymerised with a small amount of the vinyl compound of the formula $CH_2=CH-CHR_6R_7$, such as vinylcyclohexane.

Propylene is then homopolymerised or copolymerised in the presence of the prepolymerised catalyst in one or more polymerisation steps. The homo- or copolymerisation of propylene can be conducted in any suitable polymerisation process known in the art, such as in slurry polymerisation or in gas phase polymerisation or in a combination thereof.

Suitable processes for producing the propylene homo- or copolymer (iii) containing the polymeric α-nucleating agent (ii) are disclosed, among others, in WO-A-99/24479, WO-A-00/68315, EP-A-1801157, EP-A-1801155 and EP-A-1818365. Typically the propylene homo- or copolymer (iii) then contains from 0.1 to 200 ppm by weight of the polymeric α-nucleating agent (ii), preferably from 1 to 100 ppm by weight, more preferably from 5 to 50 ppm by weight of the polymeric α-nucleating agent (ii), the ppm's being based on the weight of the propylene homo- or copolymer (iii). Also in this embodiment it is preferred that the propylene homo- or copolymer (iii) is a propylene homopolymer, and it is further preferred that the propylene homopolymer has a relatively high content of isotactic material, as indicated, for instance, by a high percentage of cold xylene insoluble material, like at least 96% by weight, or at least 97% by weight, or at least 98% by weight.

Conventional Additives

In addition the propylene polymer composition (A) comprises one or more conventional additives (iv). The conventional additives (iv) used in the present invention are preferably selected from the group consisting of antioxidants, acid scavengers and stabilisers.

The homopolymer of propylene according to the present invention has an isotacticity of from 93 to 98%. It has been found that especially when homopolymers of propylene having an isotacticity of from 95 to 98% are used in making films the polymer is more prone to degradation than the conventional homopolymer of propylene having an isotacticity of from 90 to 94%. Therefore, more effective stabilisation is required for the polymer.

The antioxidants and stabilisers used in the present invention are preferably selected from the group of hindered phenols and more preferably from the group of hindered phenols not containing phosphorous or sulphur.

The antioxidants and stabilisers used in the present invention are especially preferably one or more compounds selected from the group consisting of 1,3,5-trimethyl-2,4,6-tris(3,5-di-tert-butyl-4-hydroxybenzyl)benzene (sold under trade names Irganox 1330, Anox 330, Ethanox 330 and Kinox-30), pentaerythrityl-tetrakis (3-(3',5'-di-tert. butyl-4-hydroxyphenyl)-propionate (sold under trade names Irganox 1010, Anox 20, Ethanox 310TF and Kinox-10), octadecyl 3-(3',5'-di-tert. butyl-4-hydroxyphenyl)propionate (sold under trade names Irganox 1076, Anox PP 18 and Kinox-16), butylhydroxytoluene (sold under trade names Ionol CP and Vulkanox BHT), 1,3,5-tris(3',5'-di-tert. butyl-4'-hydroxybenzyl)-isocyanurate (sold under trade names Irganox 3114, Anox IC-14, Ethanox 314 and Kinox-34), and 2,5,7,8-tetramethyl-2(4',8',12'-trimethyltridecyl)chroman-6-ol (sold under trade names Irganox E 210 and alpha-tocopherol).

The antioxidants and stabilisers are preferably present in a total amount of from 500 to 8000 ppm, based on the weight of the propylene polymer composition (A). More preferably, antioxidants and stabilisers are present in a total amount of from 800 to 7000 ppm, still more preferably of from 1000 to 6000 ppm, and in particular from 1500 to 6000 ppm, based on the weight of the propylene polymer composition (A).

In particular, the antioxidants and stabilisers do not preferably contain phosphorous containing secondary antioxidants, such as tris(2,4-ditert-butylphenyl)phosphite, because such compounds increase the dissipation in the final capacitor.

Acid scavengers are typically salts of organic acids, such as stearates. They have the function of neutralising acids in polymer. Examples of such compounds are calcium stearate, zinc stearate and zinc oxide. Acid scavengers are typically used in an amount of from 50 ppm to 2000 ppm, more preferably from 50 ppm to 1000 ppm.

Polymer Composition

The polymer composition comprises from 90 to 99.99% by weight, preferably from 90 to 99.9% by weight, more preferably from 95 to 99.9% by weight and in particular from 99 to 99.9% by weight of the high isotactic homopolymer of propylene (i). In addition the polymer composition comprises from 0.0000001 to 1% by weight of a polymeric α-nucleating agent (ii). The polymer composition also comprises from 0.01 to 1.0% by weight of conventional additives (iv).

Optionally and preferably, the polymer composition comprises from 0 to 9.99% by weight of a propylene homo- or copolymer (iii) other than (i). When present the propylene homo- or copolymer (iii) preferably comprises the polymeric α-nucleating agent in an amount of from 0.1 to 200 ppm, preferably from 0.5 to 100 ppm and in particular from 1 to 50 ppm, based on the amount of the propylene homo- or copolymer (iii). The amount of the propylene homo- or copolymer (iii) containing the polymeric α-nucleating agent (ii) is then preferably from 0.1 to 10% by weight, more preferably from 0.1 to 5% by weight, and in particular from 0.1 to 1% by weight.

Unless otherwise mentioned, the percentages above are all based on the total amount of the propylene polymer composition.

The composition preferably has a melt flow rate $MFR_2$ of from 0.5 to 10 g/10 min, preferably from 1 to 7 g/10 min.

Preferably the propylene polymer composition comprises only linear polypropylene. Thereby, the propylene homopolymer (i) and the propylene homo- or copolymer (iii) do not contain long chain branches. Furthermore, no further polymer containing long chain branches is added to the propylene polymer composition.

Especially preferably, the propylene polymer composition consists of the high isotactic homopolymer of propylene (i), the polymeric α-nucleating agent (ii), the propylene homo- or copolymer (iii) and the conventional additives (iv) with the amounts given above.

According to an especially preferred embodiment the propylene polymer composition (A) comprises, preferably consists of, from 95 to 99.9% by weight of the high isotactic homopolymer of propylene (i), from 0.1 to 5% by weight of the propylene homo- or copolymer (iii) containing the polymeric α-nucleating agent (ii) in an amount of from 0.5 to 100 ppm of the weight of the propylene homo- or copolymer (iii), and from 0.05 to 0.8% by weight of conventional additives (iv).

According to an even more preferred embodiment the propylene polymer composition (A) comprises, preferably consists of, from 98.2 to 99.8% by weight of the high isotactic homopolymer of propylene (i), from 0.1 to 1% by weight of the propylene homo- or copolymer (iii) containing the polymeric α-nucleating agent (ii) in an amount of from 0.5 to 100 ppm, or more preferably from 1 to 50 ppm, of the weight of the propylene homo- or copolymer (iii), and from 0.1 to 0.8% by weight of conventional additives (iv).

BOPP Film

The biaxially oriented polypropylene film comprises at least one layer comprising the propylene polymer composition (A). In addition the film may also include further layers, such as metal layers in case the film is metallised.

Preferably the layer comprising the propylene polymer composition (A) contains from 90 to 100% by weight of the propylene polymer composition (A), based on the total weight of the film layer. More preferably, the layer contains from 95 to 100% by weight of the propylene polymer composition (A) and even more preferably from 98 to 100% by weight, such as 99 to 100% by weight. Especially preferably, the film layer consists of the propylene copolymer composition (A).

As described above, the film may include additional layers. It is thus possible that the film comprises another layer comprising, for instance, the high isotactic homopolymer of propylene (i). The film may also include a metal layer. The metal layers are present especially if the film is used for making capacitors.

According to one suitable method the film layer is extruded through a flat die. The extrudate is cooled in a chill roll so that the film solidifies. Then the temperature is adjusted to 145-150° C. by passing the film over heated rollers. When the film has the desired temperature it is passed through one or more set of drawing rollers so that the stretch ratio at the end is from 4:1 to 10:1, preferably from 4:1 to 6:1.

For instance, the melt is first extruded through the die to a chill roll. The chill roll is cooled with cooling water typically to a surface temperature of from 10 to 100° C., preferably from 20 to 98° C. The thickness of the sheet is from 50 to 1000 µm, preferably from 100 to 500 µm.

The sheet after the chill roll preferably contains at most 15% by weight, more preferably at most 12% by weight and even more preferably at most 10% by weight of β-crystalline polypropylene, based on the total amount of crystalline polypropylene in the propylene polymer composition.

Thereafter the film is passed on to a series of annealing rollers where it is heated to such temperature that the film does not shrink in machine direction. For instance, the sheet is passed through an oven to a set of heating and cooling rolls. As an example, the sheet is passed to two heating rolls running at a relatively low speed and from there to two cooling rolls running at a relatively high speed.

The temperature in the heating oven is typically from 120 to 150° C. and the surface temperature of the heating rolls is from 100 to 160° C., preferably from 110 to 150° C. The ratio of the speed of the heating roll to the speed of the cooling roll is typically from 1:3 to 1:10, preferably from 1:4 to 1:6.

The film is then passed to a chain containing clips which close on to the film. The film is heated to a temperature which is somewhat greater than 160° C. after which the chain diverges to a ratio of 5:1 to 10:1, preferably 8:1 to 10:1 (final width:original width). Thereafter the film is annealed at a temperature within the range of about 155° C. to 160° C. or even greater for reducing the shrinkage. Thereafter the edges are trimmed off and the film is slit and wound.

Eventual additional polymer layers may be produced by any means known in the art. Thus, they may be, and they preferably are, coextruded with the film layer according to the present invention. Alternatively, they may be laminated to form the film structure.

The film may also contain, and it preferably contains, a metal layer. The metal layer can be deposited to the film surface in any manner known in the art, such as by electric smelting vacuum deposition, by ion beam vacuum deposition, by sputtering or by ion plating. The thickness of such metal layer is typically from 100 Å (0.01 µm) to 5000 Å (0.5 µm).

The thickness of the BOPP film is typically from 0.5 to 10 µm, preferably from 1 to 6 µm, such as 1 to 3 µm.

Benefits of the Invention

The propylene polymer composition allows thin films to be made. The films have good electric properties. They can be produced by using a simple and economic process. They have a good thermal stability and aging resistance.

Description of Methods

Breakdown Voltage

The breakdown voltage (BDV) was determined according to DIN IEC 60243-2. (Voltage-type: DC; Electrode-setup: Sphere/Plate with aluminium foil).

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-d2 (TCE-d2). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, 15 B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

By pentad isotacticity is meant the fraction of isotactic pentads (mmmm).

Rheology:

Dynamic rheological measurements were carried out with Rheometrics RDA-II QC on compression moulded samples under nitrogen atmosphere at 230° C. using 25 mm diameter plate and plate geometry. The oscillatory shear experiments were done within the linear viscoelastic range of strain at frequencies from 0.015 to 300 rad/s (ISO 6721-10).

The values of storage modulus (G'), loss modulus (G"), complex modulus (G*) and complex viscosity (η*) were obtained as a function of frequency (ω).

The Zero shear viscosity (η$_0$) was calculated using complex fluidity defined as the reciprocal of complex viscosity. Its real and imaginary part are thus defined by $f'(\omega)=\eta'(\omega)/[\eta'(\omega)^2+\eta''(\omega)^2]$ and $f''(\omega)=\eta''(\omega)/[\eta'(\omega)^2+\eta''(\omega)^2]$ From the following equations $\eta'=G''/\omega$ and $\eta''=G'/\omega$ $f'(\omega)=G''(\omega)\cdot\omega/[G'(\omega)^2+G''(\omega)^2]$ $f''(\omega)=G''(\omega)\cdot\omega/[G'(\omega)^2+G''(\omega)^2]$ The complex viscosity ratio eta*(0.05 rad/sec)/eta*(300 rad/sec), also the shear thinning index is the ratio of the complex viscosity (η*) at 0.05 rad/sec to the complex viscosity (η*) at 300 rad/sec.

The polydispersity index, PI, PI=$10^5/G_c$, is calculated from the cross-over point of G'(ω) and G"(ω), for which G'(ω$_c$)=G"(ω$_c$)=G$_c$ holds.

Melt Flow Rate

Melt flow rate (MFR, MFR$_2$) was determined according to ISO 1133 at 230° C. under the load of 2.16 kg.

Melting Temperature and Crystallinity of the Film

Melting temperature was measured on about 5 to 7 mg film samples with a TA Instrument Q200 differential scanning calorimetry (DSC). DSC is run according to ISO 11357/part 3/method C2 in a heat/cool/heat cycle with a scan rate of 10° C./min in the 30 temperature range of −30 to +225° C. The crystallinity is obtained by dividing the measured melting enthalpy (in J/g) by the melting enthalpy of 100% crystalline polypropylene, 209 J/g.

Wide-Angle X-Ray Scattering (WAXS)

Diffractograms were obtained in reflection geometry with a Bruker D8 Discover equipped with an X-ray tube with a copper target operating at 40 kV and 40 mA and a GADDS 2-D detector. 3 measurements have been performed on each sample, with variable acquisition time from 300 seconds up to 1 hour depending on the thickness of the sample to ensure a good signal to noise ratio. In the case of the analysis on pellets, samples were prepared at the DSC by cooling the melt with a controlled and standard cooling rate of 10° C./min. The 2-dimensional pattern was integrated between 2θ=10° and 2θ=32.5° to obtain a 1-dimensional curve of intensity vs 2θ. The amorphous halo obtained from an atactic polypropylene was properly scaled and subtracted from each intensity vs. 2θ curve obtained on actual samples and this results in the crystalline curve.

The degree of crystallinity Xc is defined as the ratio of the area under the crystalline curve and the original curve using the method proposed by Challa et al. (Makromol. Chem. vol. 56 (1962), pages 169-178) as:

$$X_c = \frac{\text{Area under crystalline curve}}{\text{Area under original curve}} \cdot 100\%$$

The amount of β-crystalline polymer from the total crystalline polymer (K$_β$) was calculated by using the method proposed by Turner-Jones et al. (Macromol. Chem. Vol 75 (1964), pages 134-158) as:

$$K_\beta = \frac{I^\beta(300)}{I^\alpha(110) + I^\alpha(040) + I^\alpha(130) + I^\beta(300)} \cdot 100$$

Where $I^\beta(300)$ is the intensity of β(300) reflection, $I^\alpha(110)$ is the intensity of α(110) reflection, $I^\alpha(040)$ is the intensity of α(040) reflection and $I^\alpha(130)$ is the intensity of α(130) reflection.

Yellowness Index

Yellowness index was determined according to ASTM E-313.

Ash Content

The ash content of the polymer was determined by combusting the polymer in a weighed platinum crucible. About 100 grams of polymer is weighed into the crucible. The crucible is then heated in a Bunsen burner flame so that the polymer slowly burns. After the polymer is completely burned the crucible is cooled, dried and weighed. The ash content is then the weight of the residue divided by the weight of the polymer sample. At least two measurements are made and if the difference between the measurements is more than 7 ppm then a third measurement is made.

Xylene Soluble

The amount of xylene soluble fraction was determined according to ISO 16152. The amount of polymer which remains dissolved at 25° C. after cooling is given as the amount of xylene soluble polymer, and correspondingly, the remaining part is cold xylene insoluble polymer.

EXAMPLES

Reference Example 1

Preparation of the High Isotactic Homopolymer of Propylene (i)

The polymerisation process according to Inventive Example 1 of EP-A-2543684 was used for the polymerisation of propylene. Hydrogen and propylene were fed into the reactor so that in each of the polymerisation reactors a propylene homopolymer having $MFR_2$ of about 3.9 g/10 min was produced. Into the polymer was added Irganox 1010 in an amount of 4500 ppm, BHT in an amount of 1000 ppm and 70 ppm of calcium stearate. The propylene homopolymer had a polydispersity index of 5.5 $Pa^{-1}$, a shear thinning index of 14, ash content of 8 ppm and a pentad isotacticity of 96.2%.

Reference Example 2

The procedure of Reference Example 1 was repeated except that the propylene homopolymer had $MFR_2$ of 3.9 g/10 min.

Reference Example 3

Preparation of the Propylene Homopolymer (iii) Including the Polymeric Nucleating Agent (ii)

(a) Preparation of the Solid Catalyst Component

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

(b) Prepolymerisation with Vinylcyclohexane

Triethylaluminium (TEAL), dicyclopentyldimethoxysilane (DCPDMS) as donor (Do), catalyst as produced above and vinylcyclohexane (VCH) were added into oil, e.g. Technol 68, provided in amounts so that Al/Ti was 3-4 mol/mol, Al/Do was as well 3-4 mol/mol, and weight ratio of VCH/solid catalyst was 1/1. The mixture was heated to 60-65° C. and allowed to react until the content of the unreacted vinylcyclohexane in the reaction mixture was less than 1000 ppm. Catalyst concentration in the final oil-catalyst slurry was 10-20 wt-%.

(c) Polymerisation

A stirred tank reactor having a volume of 40 dm³ was operated as liquid-filled at a temperature of 28° C. and a pressure of 54 bar. Into the reactor was fed propylene (70 kg/h) so much that the average residence time in the reactor was 0.3 hours and hydrogen so that the feed ratio of hydrogen to propylene was 0.1 mol/kmol and 2.6 g/h of a polymerization catalyst prepared according to the description above with triethyl aluminium (TEA) as a cocatalyst and dicyclopentyldimethoxysilane (DCPDMS) as external donor so that the molar ratio of TEA/Ti was about 130 mol/mol and TEA/DCPDMS was 130 mol/mol.

The slurry from this prepolymerisation reactor was directed to a loop reactor having a volume of 150 dm³ together with 145 kg/h of propylene and hydrogen so that the $MFR_2$ of the propylene copolymer was 3 g/10 min. The loop reactor was operated at a temperature of 80° C. and a pressure of 54 bar. The production rate of propylene homopolymer was 25 kg/h.

The polymer slurry from the loop reactor was directly conducted into a first gas phase reactor operated at a temperature of 75° C. and a pressure of 27 bar. Into the reactor were fed additional propylene and hydrogen. The production rate in the reactor was 22 kg/h and the copolymer withdrawn from the reactor had a melt flow rate $MFR_2$ of 3 g/10 min. The XCS of the copolymer was 1.8%. The split of the polymer produced in the loop reactor to the polymer produced in the gas phase reactor was 53:47.

The polymer was withdrawn from the reactor and mixed with effective amounts of Irgafos 168, Irganox 1010 and calcium stearate.

The mixture of polymer and additives produced according to the description above was extruded to pellets by using a ZSK70 extruder (product of Coperion) with L/D of 35. The specific energy input was 180 kWh/ton. The melt temperature at the die plate was 265° C.

The pellets were recovered, dried and analysed. The pelletised copolymer had $MFR_2$ of 3.8 g/10 min. The polymer contained about 20 ppm of poly(vinylcyclohexane) (PVCH).

Reference Example 4

100 parts per weight of a homopolymer of propylene in powder form having $MFR_2$ of 0.2 g/10 min was charged to a continuous mixer operated at a temperature of 45° C. together with 0.1 parts per weight of calcium stearate and 0.5 parts per weight of bis(tert-butylperoxy)-2,5,-dimethylhexane and 1.1 parts per weight of butadiene. The components were passed co-currently in substantial plug flow through the mixer in nitrogen atmosphere so that the average residence time in the mixer was 6 minutes. From the mixer the powder, impregnated with peroxide and butadiene, was introduced to a twin screw extruder together with 0.1 parts per weight of tetrakis(methylene(3,5-di-tert-butylhydroxyl-hydrocinnamate)methane) and 0.1 parts per weight of tris (2,4,-di-tert-butylphenyl)phosphite. The temperature of the melt in the extruder was about 235° C. The melt was degassed at the downstream end of the extruder by using water as a stripping agent for removing the unreacted butadiene.

The resulting polymer contained 1.0% by weight of incorporated butadiene units and had $MFR_2$ of 0.85 g/10 min.

Example 1

A blend of pellets of 99.5% by weight of polymer produced according to Reference Example 1 and 0.5% by weight of polymer produced according to Reference Example 3 was extruded to pellets. The thus obtained pellets were extruded and oriented to a BOPP film on a Brückner Maschinenbau film and orientation line (Karo IV laboratory stretcher: temperature 159° C., strain rate 400%/s). The film was oriented in machine direction at a ratio of 7:1 and in transverse direction at a ratio of 7:1. The thickness of the film was 6 μm.

The propylene polymer composition thereby contained 0.1 ppm of PVCH. The polymer in the film was subjected to analyses and the data is shown in Table 1.

Example 2

The procedure of Example 1 was repeated except that the resin of Reference Example 2 was used in place of the resin of Reference Example 1.

Comparative Example 1

The procedure of Example 2 was repeated except that the polymer produced according to Reference Example 3 was not present in the composition which thus contained only the resin produced according to Reference Example 2.

Comparative Example 2

The procedure of Comparative Example 1 was repeated except that into the polymer was added 4 ppm by weight of Quinacridonequinone CGNA-7588 supplied by BASF as a β-nucleating agent.

Comparative Example 3

The procedure of Example 1 was repeated except that instead of the polymer produced according to Reference Example 3 a polymer produced according to Reference Example 4 was used in an amount of 2% by weight, based on the total amount of the composition.

Comparative Example 4

The procedure of Comparative Example 2 was repeated except that the amount of Quinacridonequinone CGNA-7588 supplied by BASF was 1 ppm by weight.

Comparative Example 5

The procedure of Comparative Example 4 was repeated except that in place of the resin produced according to Reference Example 2 a blend containing 99.5% by weight of the resin produced according to Reference Example 2 and 0.5% by weight of the resin produced according to Reference Example 4 was used.

Comparative Example 6

The procedure of Comparative Example 5 was repeated except that the blend contained 99.75% by weight of the resin produced according to Reference Example 2 and 0.25% by weight of the resin produced according to Reference Example 4.

The films of Example 1 and Comparative Examples 1 to 6 were subjected to test for determining the breakdown voltage (BDV). The data is shown in Table 2.

TABLE 1

Analysis of the polymer composition from the pellets

| Example | $MFR_2$, g/10 min | $T_c$, ° C. | $T_m$, ° C. | $X_c$, % | $K_\beta$, % | Content of PVCH, ppm |
|---|---|---|---|---|---|---|
| E1 | 3.8 | 125.3 | 165.4 | 71.7 | 0 | 0.1 |
| E2 | 3.3 | 124.8 | 165.6 | N.M | N.M | 0.1 |
| CE1 | 3.3 | 113.7 | 163.9 | 68.7 | 10 | 0 |
| CE5 | 3.9 | 124.4 | 165.7 | 68.0 | 40 | 0 |

Samples were taken during the film production of Examples 1 and 2 and Comparative Examples 1 and 5 from the 250 μm sheet after the chill roll before the orientation. The data is shown in Table 2.

TABLE 2

Properties of 250 μm cast film after the chill roll (chilled at 90° C.) before orientation

| Example | $X_c$, % | $K_\beta$, % |
|---|---|---|
| E1 | 71.2 | 7 |
| E2 | 69.3 | 10 |
| CE1 | 69.2 | 21 |
| CE5 | 69.9 | 38 |

TABLE 3

Breakdown voltage of 6 μm BOPP films

| Example | BDV, V/μm |
|---|---|
| CE1 | 498 |
| CE2 | 544 |
| CE3 | 654 |
| CE4 | 618 |
| CE5 | 600 |
| CE6 | 430 |
| E1 | 736 |

Example 3

The procedure of Example 2 was repeated except that the orientation steps were changed so that the final film had a thickness of 3 μm. Data is shown in Table 4.

Comparative Example 7

The procedure of Comparative Example 5 was repeated except that the orientation steps were changed so that the final film had a thickness of 3 μm. Data is shown in Table 4.

Comparative Example 8

The procedure of Comparative Example 1 was repeated except that the orientation steps were changed so that the final film had a thickness of 3 μm. Data is shown in Table 4.

TABLE 4

Tensile strength, modulus, shrinkage and breakdown voltage of 3 μm BOPP films

| Ex. | Tensile MD, N/mm$^2$ | Tensile TD, N/mm$^2$ | Modulus MD, N/mm$^2$ | Modulus TD, N/mm$^2$ | Shrinkage, MD, % | Shrinkage, TD, % | BDV, V/μm |
|---|---|---|---|---|---|---|---|
| E3 | 172 | 365 | 2470 | 4760 | 3.8 | 1.2 | 216 |
| CE7 | 183 | 354 | 2620 | 4550 | 4.5 | 0.7 | 206 |
| CE8 | 176 | 356 | 2530 | 4640 | 4.5 | 1.1 | 214 |

Example 4

The procedure of Example 1 was repeated except that the orientation steps were changed so that the final film had a thickness of 3 μm.

Comparative Example 9a

The polymerisation process according to Comparative Example 2 of EP-A-2543684 was used for the polymerisation of propylene. The amount of external donor was lowered to obtain a pentad isotacticity of 96%.

The thus obtained pellets were extruded and oriented to a BOPP film on a Brückner Maschinenbau film and orientation line (Karo IV laboratory stretcher: temperature 159° C., strain rate 400%/s). The film was oriented in machine direction at a ratio of 7:1 and in transverse direction at a ratio of 7:1. The thickness of the film was 6 μm.

Comparative Example 9b

The procedure of comparative example 9a was repeated except that the orientation steps were changed so that the final film had a thickness of 3 μm.

Comparative Example 10a

The polymer of reference example 1 was blended with WB140HMS, a high melt strength polypropylene commercially available from Borealis, and with the beta-nucleating agent gamma-quinacridone such that the final amount of WB140HMS is 1 wt. % and of gamma-quinacridone is 1 ppm.

The thus obtained pellets were extruded and oriented to a BOPP film on a Brückner Maschinenbau film and orientation line (Karo IV laboratory stretcher: temperature 159° C., strain rate 400%/s). The film was oriented in machine direction at a ratio of 7:1 and in transverse direction at a ratio of 7:1. The thickness of the film was 6 μm.

Comparative Example 10b

The procedure of comparative example 10a was repeated except that the orientation steps were changed so that the final film had a thickness of 3 μm.

Comparative Example 11a

Reference example 1 was repeated whereby the hydrogen concentration was adjusted to obtain a polydispersity index of 5.43 Pa$^{-1}$.

The thus obtained pellets were extruded and oriented to a BOPP film on a Brückner Maschinenbau film and orientation line (Karo IV laboratory stretcher: temperature 159° C., strain rate 400%/s). The film was oriented in machine direction at a ratio of 7:1 and in transverse direction at a ratio of 7:1. The thickness of the film was 6 μm.

Comparative Example 11b

The procedure of comparative example 11a was repeated except that the orientation steps were changed so that the final film had a thickness of 3 μm.

The properties are given in the following tables, the shrinkage was determined 1 hour after production of the film

| Examples 6 μm film | Tensile strength N/mm$^2$ | Tensile stress at break N/mm$^2$ | Modulus MD, N/mm$^2$ | Shrinkage MD, % |
|---|---|---|---|---|
| Ex 1 | 114.57 | 114.56 | 2788 | 2.93 |
| CE9a | n.a. | n.a. | n.a. | 3.68 |
| CE10a | 102.93 | 102.68 | 2815 | 3.67 |
| CE11a | 103.77 | 103.24 | 2687 | 3.13 |

| Examples 3 μm film | Tensile strength N/mm$^2$ | Tensile stress at break N/mm$^2$ | Modulus MD, N/mm$^2$ | Shrinkage MD, % |
|---|---|---|---|---|
| Ex 4 | 88.59 | 88.29 | 2301 | 3.80 |
| CE9b | n.a. | n.a. | n.a. | 5.60 |
| CE10b | 85.00 | 84.43 | 2310 | 4.52 |
| CE11b | 71.93 | 71.11 | 2066 | 4.48 |

Furthermore, for example 1, and comparative examples 9a, 10a and 11a the change of the shrinkage of the films after two and four weeks was also determined. The results are given as deviation from the value obtained after one hour, i.e. as Δ(shrinkage) in %.

| Examples | Shrinkage MD, % 1 h after production | Δ(shrinkage) in % 2 weeks after production | Δ(shrinkage) in % 4 weeks after production |
|---|---|---|---|
| Ex 1 | 2.93 | −6.1 | 0 |
| CE9a | 3.68 | −9.8 | −0.6 |
| CE10a | 3.67 | −26 | −17 |
| CE11a | 3.13 | −3 | −0.8 |

As can be seen from the above, the inventive films not only have improved tensile properties and lower shrinkage, the inventive films also have lower annealing time. Thus, the film can be processed soon after production.

The invention claimed is:
1. A biaxially oriented film comprising:
   a layer comprising a propylene polymer composition (A) comprising:
   (i) from 98.2 to 99.8% by weight of a high isotactic homopolymer of propylene (i) having a content of isotactic pentad fraction of from 93 to 98% and a melt flow rate MFR$_2$ of from 0.5 to 10 g/10 min; and
   (ii) a polymeric α-nucleating agent (ii);
   (iii) from 0.1 to 1.0% by weight of a propylene homo- or copolymer (iii) other than (i), the propylene homo- or copolymer (iii) comprising from 0.5 to 50 ppm by weight of the polymeric α-nucleating agent (ii) based on the weight of the propylene homo- or copolymer (iii); and (iv) from 0.01 to 0.8% by weight of conventional additives (iv), the percentages being based on the weight of the propylene polymer composition (A);

wherein the propylene homopolymer (i) and the propylene homo- or copolymer (iii) do not contain long chain branches and wherein no further polymer containing long chain branches is added to the propylene polymer composition (A).

2. The biaxially oriented film according to claim 1, wherein the polymeric α-nucleating agent (ii) is selected from the group consisting of polyvinylcyclohexane, poly(3-methyl-1-butene) and mixtures thereof.

3. The biaxially oriented film according to claim 1, wherein the propylene polymer composition (A) has an ash content of not more than 30 ppm by weight.

4. The biaxially oriented film according to claim 1, wherein the film comprises a layer consisting of the propylene polymer composition (A).

5. The biaxially oriented film according to claim 1, wherein the conventional additives (iv) are selected from the antioxidants, stabilisers and acid scavengers.

6. The biaxially oriented film according to claim 1, wherein the film also comprises a metal layer.

7. The biaxially oriented film according to claim 1, wherein the thickness of the film is from 1 to 10 μm.

8. A capacitor comprising a film according to claim 1.

9. The biaxially oriented film according to claim 1, wherein the propylene homo- or copolymer (iii) comprises from 5 to 50 ppm by weight of the polymeric α-nucleating agent (ii) based on the weight of the propylene homo- or copolymer (iii).

* * * * *